United States Patent Office 3,789,046
Patented Jan. 29, 1974

3,789,046
AQUEOUS AIR- AND OVEN-DRYING
COATING COMPOSITIONS
Klaus Heidel, Marl, Germany, assignor to Chemische
Werke Huls A.G., Marl, Germany
No Drawing. Continuation of application Ser. No.
884,374, Dec. 11, 1969. This application May 12,
1972, Ser. No. 252,939
Claims priority, application Germany, Dec. 17, 1968,
P 18 15 014.6
Int. Cl. C08c 11/72; C08d 9/17
U.S. Cl. 260—23.7 A                                    14 Claims

ABSTRACT OF THE DISCLOSURE

Aqueous based coating compositions having good water resistance are produced from ammonia- or amine-neutralized adducts of maleic anhydride and like dicarboxylic acids and anhydrides and butadiene homopolymers having at least 50% cis 1,4-structure and a viscosity of 30–30,000 cps. at 50° C., preferably combined with a maleic anhydride or like adduct of a natural drying or semidrying oil.

BACKGROUND OF THE INVENTION

This is a continuation of application Ser. No. 884,374, filed Dec. 11, 1969, now U.S. Pat. 3,650,761.

This invention relates to aqueous air- and oven-drying coating compositions containing, as a binder, an adduct of an unsaturated polymer and an $\alpha,\beta$-unsaturated dicarboxylic acid or the anhydride thereof.

It is known that binders dilutable with water or with aqueous solutions can be produced by the incorporation of hydrophilic groups into drying oils. For example, W. A. Riese, in "Farbe und Lack" (Paint and Varnish) 72, 547 (1966), describes adducts of drying or semidrying natural oils and $\alpha,\beta$-unsaturated carboxylic acids, such as maleic anhydride or fumaric acid, which are soluble in water after being at least partially neutralized by ammonia or amines. However, the films produced from such aqueous coating composition dry slowly at room temperature and exhibit an insufficient water resistance even after drying for several days. Only by baking, preferably in the presence of water-soluble amine-formaldehyde or phenol-formaldehyde condensates, is it possible to obtain sufficiently waterproof films.

U.S. Pat. 3,098,834 describes aqueous coating compositions containing neutralized adducts of maleic anhydride and cyclopentadiene-modified linseed oil. Although such coating compositions dry more rapidly at room temperature than unmodified linseed oil adducts, the waterproofness of the coatings is only improved to a minor extent, and is insufficient for weather-resistant exterior coatings.

U.S. Pat. 3,030,321 describes aqueous coating compositions which contain copolymers, neutralized with volatile organic bases, from adducts of drying oils and maleic anhydride, methacrylic acid or acrylic acid, and other vinyl monomers, such as styrene or vinyltoluene. Coatings of such paint compositions dry relatively rapidly at room temperature to films with good flexibility, but the resistance of these films to water and chemicals is insufficient, apparently due to insufficient cross-linking.

In U.S. 2,844,502 there is disclosed adducts of various olefinic elastomers and maleic anhydride. Prior filed application S.N. 528,376, filed Feb. 18, 1966, discloses copper-containing adducts of maleic anhydride and of polybutadienes having at least 50% cis-1,4-double bond configuration and a viscosity of 30–30,000 centipoises at 50° C.

It has now been discovered that coatings having improved drying properties and improved water-resistance are obtained using aqueous coating compositions containing as a binder an ammonia or amine neutralized adduct of an unsaturated polymer and an $\alpha,\beta$-unsaturated dicarboxylic acid or anhydride, at least 30% by weight of which adduct is an adduct of an $\alpha,\beta$-unsaturated dicarboxylic acid or the anhydride thereof and a liquid butadiene homopolymer exhibiting a viscosity of 30–30,000 centipoises at 50° C., and more than 50% of whose double bonds are in a cis-1,4-structure.

SUMMARY OF THE INVENTION

The aqueous air- and oven-drying coating compositions of this invention contain (A) 30–90% by weight, preferably 50–80% by weight, of water and, optionally, other water-miscible solvents, and
(B) 70–10% by weight, preferably 50–20% by weight, of one or more adducts, which are at least partially neutralized with ammonia or amines, of an unsaturated polymer and $\alpha,\beta$-unsaturated dicarboxylic acids or the anhydrides thereof, wherein the adduct consists of:
  (I) 0–70% by weight of an adduct of
    (1) 80–93% by weight of a natural drying or semidrying oil, and
    (2) 20–7% by weight of an $\alpha,\beta$-unsaturated dicarboxylic acid or anhydride thereof; and
  (II) 100–30% by weight of an adduct of
    (1) 80–95% by weight of a liquid butadiene homopolymer having a viscosity of 30–30,000 centipoises at 50° C. and more than 50% of whose double bonds are in the cis-1,4-structure, and
    (2) 20–5% by weight of $\alpha,\beta$-unsaturated dicarboxylic acids or the anhydrides thereof.

The coating compositions of this invention have a number of advantages over the conventional aqueous coating agents based on maleic anhydride adducts of drying oils, e.g., they form clear lacquers and enamels which, even in coating thicknesses of 100–200$\mu$, dry at room temperature within a relatively short time to hard, insoluble and high-gloss films which have excellent resistance to water, atmospheric conditions and chemicals. Even when stored for several days in water, the hardness, the elasticity, and the gloss of the films are not impaired. Moreover, the coating compositions of this invention have flawless flow characteristics on metal or glass so that the flow difficulties often occurring in connection with the conventional coating compositions, e.g., insufficient wetting and the formation of craters, are avoided. Because of these advantages, the coating compositions of this invention are suitable for priming, as well as for high-gloss top coats on a great variety of materials, such as, for example, metal, glass, wood, stone, masonry, or concrete.

The aqueous vehicle for the coating compositions of the invention can optionally contain, in addition to water, water-miscible organic volatile solvents, which promote the water dilutability of the compositions by acting as solubilizers. Examples of such solvents are monovalent alcohols of 1–4 carbon atoms, e.g., methanol, ethanol, isopropanol, or n-butanol; monoalkyl ethers of ethylene glycol, propylene glycol, or diethylene glycol wherein the alkyl group contains 1–4 carbon atoms, e.g., ethylene glycol monomethyl ether, ethylene glycol monobutyl ether, or diethylene glycol monoethyl ether; other suitable solvents are methyl acetate; ethylene carbonate; dioxane; trioxane; and dimethyl formamide. These solvents can be employed in amounts of up to 40% by weight, preferably between 5 and 30% by weight, based on the total amount of the water-solvent mixture.

For the neutralization of the adducts, in addition to ammonia, the amines customarily used in aqueous coating compositions can be used, e.g., secondary and tertiary amines, including diethylamine, morpholine, piperidine, and tris-(hydroxymethyl)aminomethane, preferably the volatile tertiary amines, such as, for example, tri-lower-alkylamines, including trimethylamine and triethylamine, tris-hydroxylower-alkylamines, including tris($\beta$-hydroxyethyl)amine, N,N - dimethyl - N-($\beta$-hydroxyethyl)amine and N,N-dimethyl-N-($\beta$-hydroxypropyl)amine, N-ethylmorpholine, N-($\beta$-hydroxyethyl)morpholine, and N-ethylpiperidine. The bases can be employed either individually or as a mixture. For example, amines having differing volatilities advantageously are employed.

Suitable $\alpha,\beta$-dicarboxylic acids for the adduct formation are those conventionally employed, e.g., maleic acid, fumaric acid, itaconic acid, citraconic acid and the anhydrides thereof. Maleic anhydride is preferred.

Drying or semidrying oils suitable for the adduct formation to produce the drying oil adduct component are those having iodine numbers of between 120 and 210, particularly those with iodine numbers of between 150 and 190, such as, for example, coconut oil, sunflower oil, soybean oil, tall oil, castor oil, oiticica oil, perilla oil, safflower oil, or preferably linseed oil or wood oil.

Liquid butadiene polymers suitable for the adduct formation to produce the butadiene adduct component are those wherein the butadiene present in the polymer structure comprises at least 95% 1,4-structure and the polymer exhibits a viscosity of between 30 and 30,000 centipoises at 50° C., preferably between 80 and 10,000 centipoises at 50° C., and whose double bonds are more than 50%, preferably more than 70%, in the cis-1,4-structure. Such liquid butadiene polymers can be produced, for example, in accordance with the process of Belgian Pat. No. 630,428. Especially useful are liquid polybutadienes having the following properties:

Structure: 70–90% cis-double bond content; 10–30% trans-double bond content; and less than 3% vinyl double bond content.
Viscosity: 150–5,000 centipoises at 50° C.
Density $d_4^{50}$: 0.885–0.895 g./ml.
Iodine number: 400–470 g. of iodine per 100 g. of polymer.

The production of the adducts from $\alpha,\beta$-unsaturated dicarboxylic acids or the anhydrides thereof and natural drying or semidrying oils is conducted in accordance with the conventional and customary methods. In general, this process is conducted by heating the starting components for 1–3 hours to temperatures of between 100 and 250° C. with a stream of an inert gas being simultaneously passed over or through the reaction mixture. The addition of small amounts of a polymerization inhibitor, usually about 0.001 to 0.2% by weight, based on the total amount of starting material, is suitable. Such polymerization inhibitors are, for example, hydroquinone, 2,5-di-tert.-butyl hydroquinone, 2,5-di-tert.-butyl benzoquinone and particularly copper and soluble copper compounds, e.g., copper naphthenate, the amounts of these latter polymerization inhibitors preferably being chosen so that the adducts contain between 0.005 and 0.5% by weight, preferably between 0.01 and 0.3% by weight of copper. The adduct formation can also be conducted in a solution. Suitable solvents are, for example, benzene, toluene, xylene, ethylbenzene, cumene and chlorobenzene.

The adducts of $\alpha,\beta$-unsaturated dicarboxylic acids or the anhydrides thereof and the liquid butadiene polymers are suitably prepared in accordance with the method of German Pat. 1,219,684 and U.S. application Ser. No. 528,376.

To produce the polybutadiene adducts, the maleic anhydride is added to the polybutadiene containing more than 50%, preferably more than 70%, centrally positioned cis-1,4-double bonds, under very simple reaction conditions. The polybutadiene is charged, together with the desired quantity of maleic anhydride and a small amount of copper and/or copper compounds, into a flask having agitation means. The mixture is heated to temperatures of 130–220° C., preferably 160–200° C., in the presence of an inert gas, such as nitrogen or carbon dioxide, circulated into the flask and through the mixture. The reaction is terminated within 1 to 5 hours, depending upon the quantity of the acid anhydride. The maleic anhydride conversion is almost quantitative. The conversion reaction can be controlled by observation in a simple manner by extraction and titration of the unconverted maleic anhydride. The titration is performed on the adducts dissolved in suitable solvents, such as chlorinated hydrocarbons or aromatics. In addition to the copper which is advantageously employed in finely divided form, the following copper compounds can be used, for example: organic copper salts, such as copper naphthenate, oleate, octoate, maleate, and acetate, copper chelate complexes with acetylacetone, acetylacetic acid ester (ethyl acetate), malonic ester, salicyclic aldoxime, anthranilic acid, nitrilo-triacetic acid, and amines. Furthermore, inorganic copper salts, such as cuprous and cupric chloride, cuprous bromide, cuprous iodide, and cyanide of copper are used.

The quantity of copper or copper compounds is selected so that the adducts generally contain 0.005–0.5%, preferably 0.01–0.3% of copper.

The adducts produced according to the present invention can have incorporated therein up to 70% by weight of maleic anhydride. With increasing anhydride content, the viscosity increases. Depending upon the viscostiy of the starting polymer, these adducts are fluid at lower quantities of anhydride, and are viscous to solid in the case of higher quantities of anhydride. For example, a polybutadiene having 79% cis-1,4, 20% trans-1,4, and 1% 1,2-double bonds, as well as an iodine number of 449, a $d_4^{20}$ density of 0.8906, a viscosity of 240 centipoises/50° C., and a molecular weight of 1,800, measured by means of vapor pressure osmosis, yields products which are fluid up to an anhydride content of about 40% and solid above a content of 40%. The densty ($d_4^{20}$) of the adducts ranges, depending upon the anhydride content, between 0.895 and 1.3, and the iodine numbers between 460 and 120.

Although the coating compositions of this invention can consist totally of adducts of the liquid butadiene polymer, it is possible, and sometimes advisable and advantageous, to employ adducts formed from a mixture of the liquid butadiene polymer and up to 70% by weight of natural drying or semidrying oils. The selection of the reaction conditions for forming such mixed adducts is dependent partially on the type of $\alpha,\beta$-unsaturated dicarboxylic acid employed and also on the quantitative ratio of the natural oils to the liquid polybutadiene. For example, three hours of heating at 220° C. are required for the quantitative addition of 10 parts by weight of maleic anhydride to 90 parts by weight of a mixture of 80 parts by weight of linseed oil and 20 parts by weight of a liquid polybutadiene having 75% cis- and 25% trans-double bonds and a viscosity of 260 centipoises at 50° C. In contrast thereto, when employing a mixture of 50 parts by weight of this liquid cis-polybutadiene and 50 parts by weight of linseed oil, two hours of heating to 200° C. are sufficent. A complete addition of 10 parts by weight of maleic anhydride to 90 parts by weight of liquid cis-polybutadiene is achieved by heating for two hours to 170° C.

The adducts can be neutralized in accordance with conventional methods at almost any phase of the production of the coating compositions. For example, the adducts can be dispersed in water or in a water-solvent mixture and can then partially or completely neutralized by the addition thereto of ammonia and/or amines. In this step, an amount of the base is added such that a clear, homogeneous solution results therefrom. From 0.2–2, usually 0.5–1 chemical equivalents of the amine or ammonia per carboxyl group are sufficient. The pH of the resulting solutions is between 6 and 10, preferably between 7 and 9.

In order to accelerate the drying process, conventional drying agents can be added to the coating compositions, e.g., soluble salts of the metals cobalt, manganese, lead nickel, chromium, zirconium, iron, zinc, aluminum, or calcium, preferably their naphthenates, resinates, oleates, linoleates, octoates or maleates. Suitably, mixtures of various metallic salts are employed with cobalt, lead, and manganese salts being preferred. An amount of drying agent is selected so that there are 0.005–3 parts by weight, preferably 0.5–1 part by weight, of the metal from the drying agent in the coating composition per 100 parts by weight of binder.

The coating compositions of this invention can contain the usual additives and auxiliary agents, for example, pigments, e.g., $TiO_2$, chalk, calcium carbonate, zinc oxide, etc., coloring agents, e.g., water soluble dyestuffs, flow agents, thixotropic agents, anticorrosion agents, and optionally, in addition thereto, other binders, such as, for example, water-soluble alkyd resins, preferably trimellitic acid resins. Other binders which can be used are water-soluble epoxy resins or water-soluble copolymers of vinyl monomers and maleic anhydride, acrylic acid, acrylamide, or vinyl alcohol.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

PREPARATION OF A NATURAL OIL AND MALEIC ANHYDRIDE ADDUCT (I)

92 parts by weight of a polybutadiene (hereinafter called number: 177 g. of iodine/100 g. of oil) and 8 parts by weight of maleic anhydride are heated in the presence of 0.2 part by weight of copper naphthenate (copper content 9%), under agitation and a small nitrogen purge stream for one hour to 100° C. Thereafter, the temperature is increased to 200° C. and the reaction terminated at this temperature within 4 hours. The conversion of the maleic anhydride is above 96%.

PREPARATION OF A LIQUID POLYBUTADIENE AND MALEIC ANHYDRIDE ADDUCT (II)

92 parts by weight of a polybutadiene (hereinafter called polybutadiene I) having the following specifics:

Viscosity: 3,740 centipoises at 20° C.
Density $d_4^{20}$: 0.91 ml.
Iodine number according to Wijs: 438 g. of iodine/100 g. of oil Distribution of double bonds: 85% cis-1,4-structure; 14% trans-1,4-structure; and 1% vinyl groups are heated with 8 parts by weight of maleic anhydride in the presence of 0.2 part by weight of copper naphthenate (copper content 9%), under agitation and a small nitrogen purge stream for one hour to 100° C. Thereafter, the temperature is increased to 180° C. and the reaction is terminated at this temperature within 2 hours. The conversion of the maleic anhydride is above 96%.

In the same manner, maleic anhydride adducts are also prepared from a polybutadiene (hereinafter called polybutadiene II) having the properties set forth below:

Viscosity: 226 centipoises at 50° C.
Density $d_4^{50}$: 0.8943 g./ml.
Molecular weight: 1,630 (determined by means of vapor pressure osmosis)
Iodine number according to Wijs: 454 g. of iodine/100 g. of oil
Distribution of double bonds: 78% cis-1,4-structure; 21% trans-1,4-structure; and 1% vinyl groups.

PREPARATION OF AN ADDUCT FROM MALEIC ANHYDRIDE AND A MIXTURE OF LIQUID POLYBUTADIENE AND LINSEED OIL

A mixture of 66 parts by weight of polybutadiene I, 22 parts by weight of linseed oil, and 12 parts by weight of maleic anhydride is heated in the presence of 0.2 part by weight of copper naphthenate, under agitation and a small nitrogen purge stream, first for one hour to 100° C. and then for 4 hours to 200° C.

PRODUCTION OF LACQUERS 100 parts by weight of an adduct described above are provided with drying properties by the addition thereto of 10 parts by volume of an ethylene glycol monobutyl ether solution containing, in 100 parts by volume, 5.65 parts by weight of cobalt octoate (cobalt content: 16%) and 23.2 parts by weight of lead octoate (lead content: 24%). Thus, the adduct contains 0.09 part by weight of cobalt and 0.555 part by weight of lead per 100 parts of weight of adduct, both calculated as the metal.

To the thus-obtained adduct, which exhibits drying properties, is added with stirring 45 parts by weight of ethylene glycol monobutyl ether, 9 parts by weight of n-butanol, 125 parts by weight of water, as well as the amines set forth in the tables, in the amounts likewise disclosed therein. Clear, homogeneous lacquer solutions are obtained thereby.

PRODUCTION AND TESTING OF THE COATINGS

The thus-obtained lacquers are applied to glass plates [panes, sheets] by means of a 100μ-scraper blade. The periods for obtaining a dust-dry state (drying stage 1 according to German Industrial Standard DIN 53,150) are determined at 24° C., and the flow of the lacquers as well as the appearance of the coatings are judged. The hardness of the dried lacquer films is determined in accordance with DIN 53,157.

In order to test the waterproofness, the films are dried continuously for 24 hours at room temperature and then stored in water having a temperature of 24° C. for 24 hours. After allowing the films to dry for one hour, they are evaluated for appearance and hardness.

TEST RESULTS

In Tables 1–4, the test results obtained in connection with a number of lacquers are compiled. In those examples wherein there was a deviation from the above-described mode of operation and testing methodology, the conditions employed are separately set forth.

mixtures were heated to 50° C. and mixed with an amount of N,N-dimethylaminoethanol such that a clear homogeneous lacquer solution was obtained.

TABLE 1

| | Adduct, in parts by weight, of— | | Reaction conditions during adduct production (hours/° C.) | Amine (parts by weight) | Dust drying time acc. to DIN 53,150 (hours) | Hardness acc. to DIN 53,157 (sec.) | Progression | Appearance | Waterproofness |
|---|---|---|---|---|---|---|---|---|---|
| | Polybutadiene (type) | Maleic Anhydride | | | | | | | |
| Example: | | | | N,N-dimethyl-aminoethanol | | | | | |
| 1 | 95 (I) | 5 | 2/180 | 10 | 5 | 25 | Good | Smooth, highly glossy. | Hardness, gloss and scratch (mar) resistance unimpaired. |
| 2 | 93 (I) | 7 | 2/180 | 8 | 5 | 22 | do | do | Do. |
| 3 | 92 (I) | 8 | 2/180 | 7.9 | 4 | 23 | do | do | Do. |
| 4 | 90 (I) | 10 | 2/180 | 8 | 4 | 24 | do | do | Do. |
| 5 | 88 (I) | 12 | 3/180 | 7.8 | 3 | 25 | do | do | Do. |
| 6 | 85 (I) | 15 | 3/180 | 9.5 | 3 | 28 | do | do | Do.[1] |
| 7 | 80 (I) | 20 | 3/180 | 14.5 | 2 | 32 | do | do | Do.[1] |
| | | | | Triethyl amine | | | | | |
| 8 | 93 (II) | 7 | 2/180 | 7.8 | 3 | 24 | do | do | Hardness, gloss and scratch (mar) resistance unimpaired (Hardness: 25 sec.).[2] |
| 9 | 92 (II) | 8 | 2/180 | 9 | 4 | 25 | do | do | Hardness, gloss and scratch (mar) resistance unimpaired (hardness: 24 sec.).[2] |
| Comparative Ex.: | | | | N,N-dimethyl-aminoethanol | | | | | |
| 1 | 97 (I) | 3 | 2/180 | >14 | | | | | [3]. |
| 2 | 70 (I) | 30 | 3/180 | 14 | 2 | 30 | Good | Smooth, highly glossy. | Film dissolved. |

[1] Prior to the water storage, the films were additionally dried for 1 hour at 110° C.
[2] The adducts were provided with drying properties as described above, however, in order to prepare the lacquer, there were employed, in addition to the amount of amine set forth in the table, 36 parts by weight of ethylene glycol monobutyl ether and 110 parts by weight of water, based on 100 parts by weight of adduct. 50 parts by weight of the thus-produced clear homogeneous lacquer solutions were ground into enamels together with 14.3 parts by weight of titanium dioxide (rutile) and 0.2 part by weight of nonylphenol oxyethylate containing 9 ethylene oxide units. Prior to testing the waterproofness, the lacquer films, produced by means of a 100μ scraper blade, were dried for 72 hours at 24° C.; after the storage in water, the films were dried for 3 hours at 24° C., and then the hardness was measured.
[3] This adduct is insoluble.

TABLE 2

| | Composition of Adduct I (percent by wt.) | | | Composition of Adduct II (percent by wt.) | | | N,N-dimethyl-aminoethanol (parts by weight) | Dust drying time acc. to DIN 53,150 (hrs.) | Hardness acc. to DIN 53,157 (sec.) | Progression | Appearance | Waterproofness |
|---|---|---|---|---|---|---|---|---|---|---|---|---|
| | Adduct I (parts by weight) | Linseed oil | Maleic anhydride | Adduct II (parts by weight) | Polybutadiene I | Maleic anhydride | | | | | | |
| Example: | | | | | | | | | | | | |
| 10 | 70 | 92 | 8 | 30 | 92 | 8 | 8 | 7 | 20 | Good | Smooth, highly glossy. | Swollen to a minor extent. |
| 11 | 50 | 92 | 8 | 50 | 92 | 8 | 6 | 5 | 23 | do | do | Do. |
| 12 | 20 | 92 | 8 | 80 | 92 | 8 | 5 | 4 | 27 | do | do | Unchanged. |
| 13 | 10 | 92 | 8 | 90 | 92 | 8 | 5 | 3–4 | 28 | do | do | Do. |
| 14 | 50 | 85 | 15 | 50 | 93 | 7 | 8 | 8 | 23 | do | do | Swollen to a minor extent. |
| 15 | 50 | 93 | 7 | 50 | 85 | 15 | 6 | 7 | 23 | do | do | Do. |
| 16 | 20 | 80 | 20 | 80 | 93 | 7 | 5 | 3–4 | 30 | do | do | Unchanged. |
| Comparative Ex.: | | | | | | | | | | | | |
| 3 | 90 | 92 | 8 | 10 | 92 | 8 | 15 | >12 | 16 | | | Dissolved to about 50%. |
| 4 | 80 | 92 | 8 | 20 | 92 | 8 | 15 | >12 | 17 | | | Do. |

The mixtures of the adducts shown in Table 2 were provided with siccative properties as described hereinabove. However, in order to produce the clear lacquers, 35 parts by weight of ethylene glycol monobutyl ether and 110 parts by weight of water were employed. These Prior to testing for waterproofness, the lacquer films produced with a 100μ-scraper blade, were dried continuously for 48 hours at 24° C. and, after the water storage, the films were dried for 3 hours at 24° C.

TABLE 3

| Example: | Adduct, in parts by weight, of— | | | Reaction conditions during adduct production (hours/° C.) | Amine (parts by weight) | Dust drying time acc. to DIN 53,150 (hours) | Hardness acc. to DIN 53,157 (sec.) | Progression | Appearance | Waterproofness |
|---|---|---|---|---|---|---|---|---|---|---|
| | Polybutadiene (type) | Linseed oil | Maleic anhydride | | | | | | | |
| | | | | | N,N-dimethylaminoethanol | | | | | |
| Example: | | | | | | | | | | |
| 17 | 27.7 (I) | 64.3 | 8 | 4/200 | 7.9 | 9 | 23 | Good | Smooth, glossy. | Somewhat swollen. |
| 18 | 46 (I) | 46 | 8 | 3/200 | 7.9 | 7 | 25 | ...do | ...do | Do. |
| 19 | 22 (I) | 66 | 12 | 4/200 | 7.8 | 10 | 22 | ...do | ...do | Do. |
| 20 | 44 (I) | 44 | 12 | 4/200 | 7.8 | 7 | 27 | ...do | ...do | Do. |
| 21 | 66 (I) | 22 | 12 | 3/200 | 7.8 | 5 | 30 | ...do | ...do | Unchanged. |
| | | | | | Triethylamine | | | | | |
| 22 | 66 (II) | 22 | 12 | 3/200 | 10 | 4 | 28 | ...do | ...do | Unchanged (Hardness; 40 sec.)[1] |
| 23 | 44 (II) | 44 | 12 | 4/200 | 10 | 6 | 28 | ...do | ...do | Do.[1] |
| | | | | | N,N-dimethylethanol | | | | | |
| 24 | 23.0 (I) | 69 | 8 | 4/200 | 7 | 10 | 20 | ...do | ...do | Hardly swollen. |
| 25 | 46 | 46 | 8 | 3/200 | 7 | 6 | 26 | ...do | ...do | Do. |
| 26 | 73.6 | 18.4 | 8 | 3/200 | 5 | 3-4 | 30 | ...do | ...do | Unchanged. |
| 27 | 24 (II) | 56 | 20 | 4/200 | 15 | 8-10 | 25 | ...do | ...do | Strongly swollen, but unchanged after curing at 100° C./1 hour |
| 28 | 56 (II) | 24 | 20 | 4/200 | 15 | 2-3 | 30 | ...do | ...do | Do. |
| Comparative Ex.: | | | | | | | | | | |
| 5 | 9.2 (I) | 82.4 | 8 | 4/200 | 15 | 12 | Too soft | Poor | Craters, bubbles. | Dissolved. |
| 6 | 18.4 (I) | 73.6 | 8 | 4/200 | 15 | 12 | 17 | ...do | ...do | Strongly swollen. |

[1] The adducts were provided with siccative properties as described above. However, for producing the lacquer, in addition to the amount of amine set forth in the table, 36 parts by weight of ethylene glycol monobutyl ether and 110 parts by weight of water, based on 100 parts by weight of adduct, were employed. 50 parts by weight of the thus-obtained clear homogeneous lacquer solutions were ground into enamels together with 14.3 parts by weight of titanium dioxide (rutile) and 0.2 part by weight of nonylphenyl oxyethylate with 9 ethylene oxide units. Prior to testing the waterproofness, the lacquer films, produced with a 100μ scraper blade, were dried continuously for 72 hours at 24° C. and, after the water storage, the films were dried for 3 hours at 24° C., and then the hardness was measured.

TABLE 4

| Comparative example | Adduct, in parts by weight, of— | | Reaction conditions during adduct production (hours/° C.) | N,N-dimethylaminoethanol (parts by weight) | Dust drying time acc. to DIN 53,150 (hrs.) | Hardness acc. to DIN 53,157 (sec.) | Progression | Appearance | Waterproofness |
|---|---|---|---|---|---|---|---|---|---|
| | Oil | Maleic anhydride | | | | | | | |
| | Linseed oil | | | | | | | | |
| 7 | 95 | 5 | 3/200 | >14 | | | | | (1). |
| 8 | 92 | 8 | 4/200 | 8 | >48 | | (2) | Poor | Numerous craters | To 80% dissolved. |
| 9 | 88 | 12 | 4/200 | 8 | >48 | | (2) | ...do | ...do | Do. |
| 10 | 80 | 20 | 4/200 | 10 | >48 | | (2) | ...do | ...do | To 90% dissolved. |
| 11 | 70 | 30 | 4/200 | 14 | >48 | | (2) | ...do | ...do | Completely dissolved. |
| | Wood oil | | | | | | | | |
| 12 | 92 | 8 | 1/180 | 10 | 5 | | (2) | ...do | Matte, wrinkled | Highly swollen on soaking. |
| 13 | 88 | 12 | 1/180 | 11 | 5 | | (2) | ...do | ...do | Do. |
| | Linseed oil/ cyclopentadiene adduct | | | | | | | | |
| 14 | 90 | 10 | 3/220 | 7.8 | 10 | | (2) | Poor | Numerous craters | Highly swollen on soaking. |

[1] This adduct is insoluble.
[2] Not measurable, due to poor film characteristic.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Aqueous coating compositions, containing in an aqueous vehicle, as a binder, an adduct component which is at least partially in the form of a salt with a base selected from the group consisting of ammonia and an amine, said base being provided in an amount sufficient to result in a clear homogeneous solution having a pH between 6 and 10 which adduct component consists essentially of I. Up to 70% by weight of an adduct of:
  (1) 80–93% by weight of a natural drying or semidrying oil, and
  (2) 20–7% by weight of an α,β-unsaturated dicarboxylic acid or anhydride thereof, and
II. At least 30% by weight of an adduct of:
  (1) 80–95% by weight of a liquid butadiene homopolymer exhibiting a viscosity of 30–30,000 centipoises at 50° C., and at least 95% 1,4-structure, of which more than 50% of whose double bonds are in a cis-1,4-structure, and
  (2) 20–5% by weight of an α,β-unsaturated dicarboxylic acid or the anhydride thereof.

2. A coating composition consisting substantially of 70–10% by weight of an adduct according to claim 1 and 30–90% aqueous vehicle.

3. A coating composition according to claim 1, wherein the adduct consists of 5–50% by weight of adduct I and 95–50% by weight of adduct II.

4. A coating composition according to claim 2 wherein adduct I is the adduct of:
 (1) 85–92% by weight of the natural drying or semi-drying oil and
 (2) 15–8% by weight of the α,β-unsaturated dicarboxylic acid or the anhydride thereof.

5. A coating composition according to claim 4 wherein the adduct in each instance is an adduct of maleic anhydride.

6. A coating composition according to claim 1, wherein adduct II is the adduct of:
 (1) 88–93% by weight of the liquid butadiene homopolymer and
 (2) 12–7% by weight of the α,β-unsaturated dicarboxylic acid or the anhydride thereof.

7. A coating composition according to claim 1 wherein adducts I and II are adducts of maleic anhydride.

8. A coating composition according to claim 1, wherein the liquid butadiene homopolymer used to form adduct II has a viscosity of 80–10,000 centipoises at 50° C.

9. A coating composition according to claim 1 wherein more than 70% of the double bonds of the liquid butadiene homopolymer used to form adduct II are in the cis-1,4-structure.

10. A coating composition according to claim 1 wherein the adduct component is produced from a mixture of the natural drying or semidrying oils and the liquid butadiene homopolymer.

11. A coating composition according to claim 4 wherein adduct II is the adduct of:
 (1) 88–93% by weight of the liquid butadiene homopolymer and
 (2) 12–7% by weight of the α,β-unsaturated dicarboxylic acid or the anhydride thereof.

12. A coating composition according to claim 11 wherein adducts I and II are adducts of maleic anhydride and the liquid butadiene homopolymer used to form adduct II has a viscosity of 80–10,000 centipoises at 50° C. and more than 70% of the double bonds thereof are in the cis-1,4-structure.

13. A paint containing a coating composition according to claim 1 in mixture with a pigment.

14. A composition as defined in claim 1 wherein said base is N,N-dimethylaminoethanol or triethylamine.

References Cited

UNITED STATES PATENTS 3,518,213   6/1970   Miyoshi _____ 260—23.7 A

FOREIGN PATENTS 1,219,684   1/1967   Germany _____ 260—23.7 A

HOSEA E. TAYLOR, Primary Examiner
W. E. PARKER, Assistant Examiner

U.S. Cl. X.R.
260—265, 296 N